UNITED STATES PATENT OFFICE.

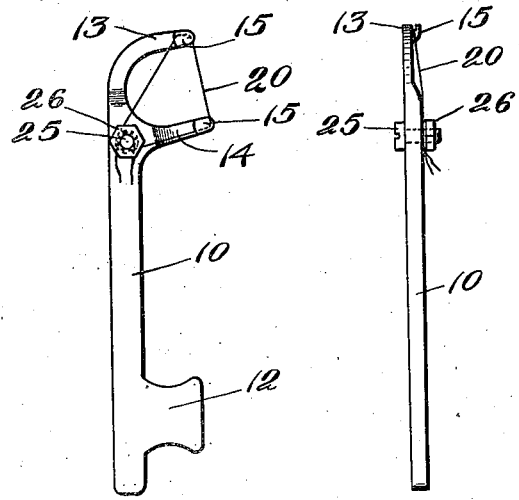

FRANK L. BAXTER, OF BOSTON, MASSACHUSETTS.

TOOTHPICK.

1,217,264.  Specification of Letters Patent.  Patented Feb. 27, 1917.

Application filed June 15, 1912. Serial No. 703,774.

*To all whom it may concern:*

Be it known that I, FRANK L. BAXTER, a citizen of the United States, residing at Boston, in the county of Suffolk and State of Massachusetts, have invented an Improvement in Toothpicks, of which the following is a specification.

This invention relates to tooth-picks or devices for cleaning the teeth, and has for its object the construction of a device for this purpose involving the employment of a taut thread or filament of silk or other material, and means to provide for the detachable connection of both ends of a piece of thread, and a hand-piece by which the device may be conveniently manipulated.

Figure 1 is a side elevation of a tooth-pick embodying this invention.

Fig. 2 is an edge view of the same.

Figs. 3, 4, and 5 are side views of modifications to be referred to.

The hand-piece here shown comprises a shank 10 having a finger-engaging projection 12 extended laterally from it near its outer end, yet so far as my invention is concerned the hand-piece may be otherwise constructed. Said hand-piece has at its inner end two arms 13, 14, which are extended in an oblique direction from the shank and arranged with a space between them. A taut thread 20 is designed to be extended across said space. Each arm 13 and 14, has at its extremity a projection 15 over which the thread passes, which may be of any suitable shape to receive and hold the thread, and the ends of the piece of thread are detachably secured by a friction-device arranged on the shank between the arms 13 and 14. Said projections and friction device provide three points for engagement of the thread and they are all arranged on the same side of the arms and shank, so that between said points the thread is not obstructed, and, therefore, extends in a straight line. As represented in Figs. 1 and 2, said friction-device consists of a bolt 25 and nut 26, said nut having a convex face adjoining the shank, and said nut when once set up tightly need never be loosened, and the ends of the thread are drawn into the converging space between the nut and the shank. As represented in Fig. 5, the ends of the thread are drawn into a converging space 30 formed in the edge of the shank by slitting it and bending one portion slightly with respect to the other. In connecting the thread to the device one end of the piece of thread is secured to the friction-device, and the other end is passed around or over the projections 15 and drawn taut and secured to the friction-device. New pieces of thread may be substituted as may be required.

In the particular detail illustrated, it will be noted that the shank of the tooth-pick is of substantially uniform dimension throughout its length, and that adjacent one end, one of the arms, as 14, is projected from the shank at an angle to the latter, which angle is other than a right angle. The shank, as particularly noted in Fig. 2, is then extended beyond the arm and reduced in thickness, being projected in practical parallelism with the first mentioned arm, as at 13, and the respective ends of the arms are formed to receive and support a thread. The thread-gripping means shown at 25 and 26 is arranged approximately at the juncture of the first-mentioned arm and shank, and wholly within the outline plane of the surface of the shank.

Referring to Fig. 3, one end of the piece of thread is formed with a loop which is placed on a hook 35 on one of the arms as 13, and the other end of the thread is carried over a projection on the other arm and is secured by the friction-device.

Referring to Fig. 4 one end of the thread is formed with a knot and enters a notch cut in one of the arms, as 13, and the other end is carried over a projection on the other arm and is engaged by the friction-device.

The device is of convenient size and shape to be manipulated by the hand and the taut thread to enter the interdental spaces and remove foreign matter therefrom.

I claim:—

As a new article of manufacture, a tooth-pick comprising a shank of approximately uniform dimension throughout its length, an arm projecting from the edge of the shank adjacent one end and disposed at an angle other than a right angle with respect to the shank, the shank being extended beyond said arm and reduced in thickness, the extension being projected laterally to form a second arm in parallelism with the first mentioned arm, the respective ends of the arms being formed to receive and support a thread, and thread gripping means carried by the shank at the juncture of the shank and first mentioned arm, said thread gripping means being arranged wholly within the outline plane of the surface of the shank, whereby to avoid projection.

In testimony whereof, I have signed my name to this specification, in the presence of two subscribing witnesses.

FRANK L. BAXTER.

Witnesses:
B. J. NOYES,
H. B. DAVIS.